United States Patent
Zang et al.

(10) Patent No.: US 9,697,031 B2
(45) Date of Patent: Jul. 4, 2017

(54) METHOD FOR IMPLEMENTING INTER-VIRTUAL PROCESSOR INTERRUPT BY WRITING REGISTER DATA IN A SINGLE WRITE OPERATION TO A VIRTUAL REGISTER

(71) Applicant: Huawei Technologies Co., Ltd., Shenzhen, Guangdong (CN)

(72) Inventors: Hongyong Zang, Beijing (CN); Haoyu Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 39 days.

(21) Appl. No.: 14/552,006

(22) Filed: Nov. 24, 2014

(65) Prior Publication Data

US 2015/0121377 A1  Apr. 30, 2015

Related U.S. Application Data

(63) Continuation of application No. PCT/CN2014/074412, filed on Mar. 31, 2014.

(30) Foreign Application Priority Data

Oct. 31, 2013 (CN) .......................... 2013 1 0531026

(51) Int. Cl.
*G06F 9/455* (2006.01)

(52) U.S. Cl.
CPC .................. *G06F 9/45558* (2013.01); *G06F 2009/45579* (2013.01); *G06F 2009/45587* (2013.01)

(58) Field of Classification Search
None
See application file for complete search history.

(56) References Cited

U.S. PATENT DOCUMENTS 6,370,606 B1 * 4/2002 Bonola ................... G06F 13/24
710/260
2007/0157197 A1 * 7/2007 Neiger ................ G06F 9/45533
718/1

(Continued)

FOREIGN PATENT DOCUMENTS

CN   101727414 A   6/2010
CN   101751284 A   6/2010

(Continued)

OTHER PUBLICATIONS

Bovet, Daniel et al. "Understanding the Linux Kernel, 3rd Edition". Nov. 17, 2005.*

*Primary Examiner* — Meng An
*Assistant Examiner* — Michael Ayers

(57) ABSTRACT

A method for implementing an inter-virtual processor interrupt is provided, which includes: when a source virtual processor needs to trigger an interrupt to a target virtual processor, writing register data that includes information about the target virtual processor and indication data used to indicate that the source virtual processor triggers the interrupt to the target virtual processor into a virtual register of a virtual advanced programmable interrupt controller (vAPIC) of the source virtual processor, so that a virtual machine monitor obtains the information about the target virtual processor and the indication data from the virtual register by means of parsing, and the virtual machine monitor injects an inter-virtual processor interrupt into the target virtual processor according to the information about the target virtual processor and the indication data. Accordingly, the embodiments of the present invention further provide a related virtual machine, a virtual controller, a computing node, and a system.

11 Claims, 5 Drawing Sheets

(56) References Cited

U.S. PATENT DOCUMENTS

| | | | | |
|---|---|---|---|---|
| 2009/0328035 A1* | 12/2009 | Ganguly | ............... | G06F 9/4812 |
| | | | | 718/1 |
| 2010/0106875 A1 | 4/2010 | Tiruvallur et al. | | |
| 2011/0197003 A1* | 8/2011 | Serebrin | ............. | G06F 9/45558 |
| | | | | 710/267 |
| 2014/0223060 A1* | 8/2014 | Tsirkin | ................... | G06F 13/32 |
| | | | | 710/261 |

FOREIGN PATENT DOCUMENTS

| | | |
|---|---|---|
| CN | 102804143 A | 11/2012 |
| CN | 103559087 A | 2/2014 |
| WO | WO 2009/134217 A1 | 11/2009 |

* cited by examiner

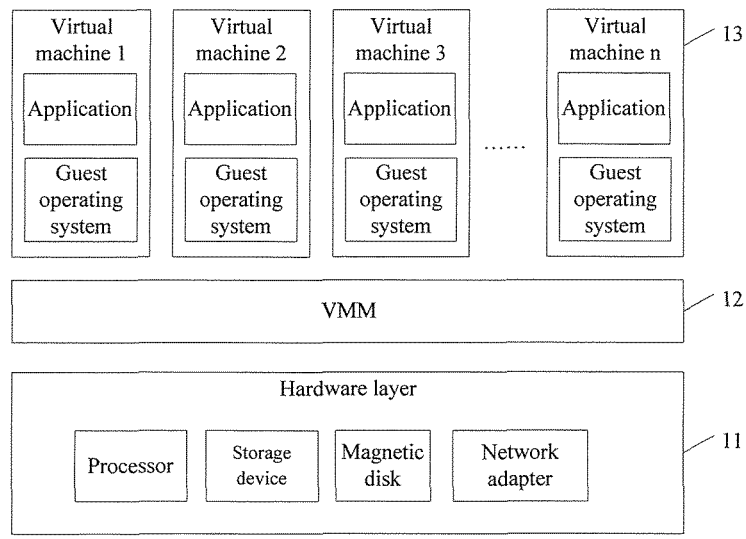

When a source vCPU needs to trigger an interrupt to a target vCPU, write register data that includes information about the target vCPU and indication data used to indicate that the source vCPU triggers the interrupt to the target vCPU into a high-order register or a low-order register of a vICR of a vAPIC of the source vCPU, so that a virtual machine monitor obtains the information about the target vCPU and the indication data from the high-order register or the low-order register by means of parsing, and the virtual machine monitor injects an inter-vCPU interrupt into the target vCPU according to the information about the target vCPU and the indication data ⸺ 301

FIG. 3

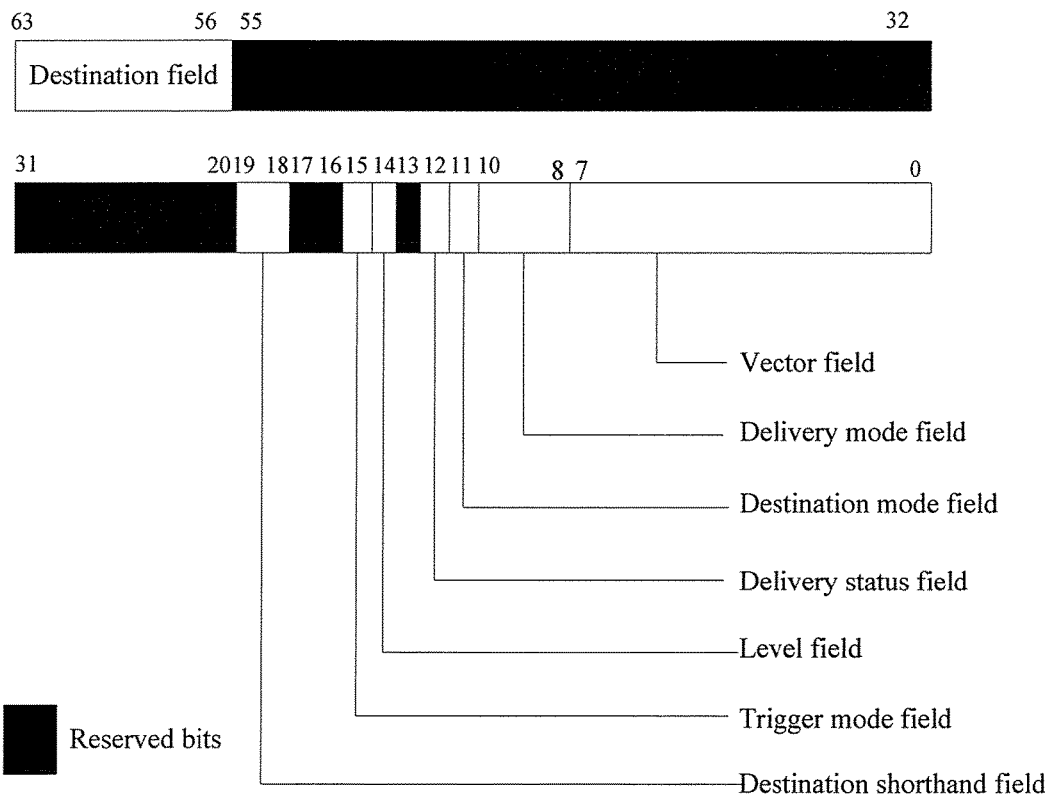

FIG. 4

METHOD FOR IMPLEMENTING INTER-VIRTUAL PROCESSOR INTERRUPT BY WRITING REGISTER DATA IN A SINGLE WRITE OPERATION TO A VIRTUAL REGISTER

CROSS-REFERENCE TO RELATED APPLICATIONS

This application is a continuation of International Application No. PCT/CN2014/074412, filed on Mar. 31, 2014, which claims priority to Chinese Patent Application No. 201310531026.4, filed on Oct. 31, 2013, both of which are hereby incorporated by reference in their entireties.

TECHNICAL FIELD

The present invention relates to the communications field, and in particular, to a method for implementing an inter-virtual processor interrupt, a related apparatus, and a system.

BACKGROUND

Currently, virtual machines have been applied widely, and interrupts often occur in the application of the virtual machines. For example, when multiple tasks run and are not bound in a symmetrical multi-processing (SMP) system, interrupts, for example, inter-processor interrupts (IPI) occur frequently due to load balancing scheduling, and certainly there may be other interrupts. However, the interrupts are all implemented by accessing a register of an advanced programmable interrupt controller (APIC). A specific implementation process is as follows:

reading a delivery status value in a virtual interrupt command register (vICR) of the APIC;

writing an identifier of a target virtual central processing unit local APIC (vLocal APIC) into a high-order register of ICR according to the delivery status value; and writing indication data used to indicate that an interrupt occurs on a target virtual central processing unit (vCPU) to which the target vLocal APIC belongs into a low-order register of the ICR, so that a virtual machine monitor (VMM) obtains, by means of parsing, the foregoing identifier registered on the high-order register of the ICR, obtains, by means of parsing, indication data registered on the low-order register of the ICR, and forwards the identifier and the indication data to the target vLocal APIC. When receiving the foregoing information, the target vLocal APIC may control the target vCPU to generate an interrupt.

It can be learned that, in the foregoing interrupt implementation process, it is required to perform operations on the APIC three times, that is, three times of virtual machine exits (VM-Exit) are caused, where a VM-Exit may specifically be understood as a context switching between the virtual machine and a Hypervisor. However, in an actual application, interrupts occur frequently on the virtual processor, which means that the VM-Exits occur on the virtual machine more frequently; as a result, performance of the virtual machine deteriorates.

SUMMARY

Embodiments of the present invention provide a method for implementing an inter-vCPU interrupt, a related apparatus, and a system.

According to a first aspect, an embodiment of the present invention provides a method for implementing an inter-vCPU interrupt, including:

when a source vCPU needs to trigger an interrupt to a target vCPU, writing register data that includes information about the target vCPU and indication data used to indicate that the source vCPU triggers the interrupt to the target vCPU into a virtual register of a virtual advanced programmable interrupt controller vAPIC of the source vCPU, so that a virtual machine monitor obtains the information about the target vCPU and the indication data from the virtual register by means of parsing, and the virtual machine monitor injects an inter-vCPU interrupt into the target vCPU according to the information about the target vCPU and the indication data.

In a first possible implementation manner of the first aspect, the virtual register is a high-order register or a low-order register of a virtual interrupt command register vICR; and the writing register data that includes information about the target vCPU and indication data used to indicate that the source vCPU triggers the interrupt to the target vCPU into a virtual register of a vAPIC of the source vCPU includes:

writing the register data that includes the information about the target vCPU and the indication data used to indicate that the source vCPU triggers the interrupt to the target vCPU into the high-order register or the low-order register of the vICR of the vAPIC of the source vCPU.

With reference to the first possible implementation manner of the first aspect, in a second possible implementation manner of the first aspect, the writing the register data that includes the information about the target vCPU and the indication data used to indicate that the source vCPU triggers the interrupt to the target vCPU into the high-order register or the low-order register of the vICR of the vAPIC of the source vCPU includes:

writing the register data that includes the information about the target vCPU and the indication data used to indicate that the source vCPU triggers the interrupt to the target vCPU into the low-order register of the vICR of the vAPIC of the source vCPU, where the information about the target vCPU is filled in a reserved bit of the low-order register; or writing the register data that includes the information about the target vCPU and the indication data used to indicate that the source vCPU triggers the interrupt to the target vCPU into the high-order register of the vICR of the vAPIC of the source vCPU, where the indication data is filled in a reserved bit of the high-order register.

With reference to the first aspect, in a third possible implementation manner of the first aspect, the writing register data that includes information about the target vCPU and indication data used to indicate that the source vCPU triggers the interrupt to the target vCPU into a virtual register of a vAPIC of the source vCPU includes:

writing register data that includes the information about the target vCPU, the indication data used to indicate that the source vCPU triggers the interrupt to the target vCPU, and optimization data into the virtual register of the vAPIC of the source vCPU, where the optimization data is filled in a reserved bit of the virtual register, and the optimization data is used to instruct the VMM to obtain the information about the target vCPU and the indication data from the virtual register by means of parsing.

With reference to the first aspect, in a fourth possible implementation manner of the first aspect, the writing register data that includes information about the target vCPU and indication data used to indicate that the source vCPU triggers the interrupt to the target vCPU into a virtual register of a vAPIC of the source vCPU includes:

writing the register data that includes the information about the target vCPU and the indication data used to indicate that the source vCPU triggers the interrupt to the target vCPU into the virtual register of the vAPIC of the source vCPU, where the information about the target vCPU is filled in a reserved bit of the virtual register, and the indication data includes data filled in a vector field, a delivery mode field, a destination mode field, a level field, a trigger mode field, and a destination shorthand field of the virtual register.

According to a third aspect, an embodiment of the present invention provides a computing node, including: a hardware layer, a VMM that runs at the hardware layer, and at least two virtual machine that runs on the VMM, where the at least two virtual machine includes a first virtual machine and a second virtual machine, the first virtual machine includes a first vCPU, the first vCPU includes a first virtual advanced programmable interrupt controller vAPIC, and the first vAPIC includes a first virtual register; and the second virtual machine includes a second vCPU, where:

the first vCPU is configured to: when the first vCPU needs to trigger an interrupt to the second vCPU, write register data that includes information about the second vCPU and indication data used to indicate that the first vCPU triggers the interrupt to the second vCPU into the first virtual register; and the VMM is configured to obtain the information about the second vCPU and the indication data from the first virtual register by means of parsing, and inject an inter-vCPU interrupt into the second vCPU according to the information about the second vCPU and the indication data, where the inter-vCPU interrupt includes an interrupt between the first vCPU and the second vCPU.

In a first possible implementation manner of the third aspect, the first virtual register is a high-order register or a low-order register of a virtual interrupt command register vICR;

the first vCPU is specifically configured to: when the first vCPU needs to trigger the interrupt to the second vCPU, write the register data that includes the information about the second vCPU and the indication data used to indicate that the first vCPU triggers the interrupt to the second vCPU into the high-order register or the low-order register; and the VMM is specifically configured to obtain the information about the second vCPU and the indication data from the high-order register or the low-order register by means of parsing, and inject the inter-vCPU interrupt into the second vCPU according to the information about the second vCPU and the indication data, where the inter-vCPU interrupt includes the interrupt between the first vCPU and the second vCPU.

With reference to the first possible implementation manner of the third aspect, in a second possible implementation manner of the third aspect, the first vCPU is specifically configured to: when the first vCPU needs to trigger the interrupt to the second vCPU, write the register data that includes the information about the second vCPU and the indication data used to indicate that the first vCPU triggers the interrupt to the second vCPU into the low-order register, where the information about the second vCPU is filled in a reserved bit of the low-order register; and the VMM is specifically configured to obtain the information about the second vCPU from the reserved bit of the low-order register by means of parsing, obtain the indication data from the low-order register by means of parsing, and inject the inter-vCPU interrupt into the second vCPU according to the information about the second vCPU and the indication data, where the inter-vCPU interrupt includes the interrupt between the first vCPU and the second vCPU; or the first vCPU is specifically configured to: when the first vCPU needs to trigger the interrupt to the second vCPU, write the register data that includes the information about the second vCPU and the indication data used to indicate that the first vCPU triggers the interrupt to the second vCPU into the high-order register, where the indication data is filled in a reserved bit of the high-order register; and the virtual machine monitor is specifically configured to obtain the indication data from the reserved bit of the high-order register by means of parsing, obtain the information about the second vCPU from the high-order register by means of parsing, and inject the inter-vCPU interrupt into the second vCPU according to the information about the second vCPU and the indication data, where the inter-vCPU interrupt includes the interrupt between the first vCPU and the second vCPU.

With reference to the third aspect, in a third possible implementation manner of the third aspect, the first vCPU is specifically configured to: when the first vCPU needs to trigger the interrupt to the second vCPU, write register data that includes the information about the second vCPU, the indication data used to indicate that the first vCPU triggers the interrupt to the second vCPU, and optimization data into the first virtual register, where the optimization data is filled in a reserved bit of the virtual register, and the optimization data is used to instruct the VMM to obtain the information about the second vCPU and the indication data from the first virtual register by means of parsing; and the VMM is specifically configured to obtain the optimization data from the first virtual register by means of parsing, obtain the information about the second vCPU and the indication data from the first virtual register by means of parsing according to the optimization data, and inject the inter-vCPU interrupt into the second vCPU according to the information about the second vCPU and the indication data, where the inter-vCPU interrupt includes the interrupt between the first vCPU and the second vCPU.

With reference to the third aspect, in a fourth possible implementation manner of the third aspect, the first vCPU is specifically configured to: when the first vCPU needs to trigger the interrupt to the second vCPU, write the register data that includes the information about the second vCPU and the indication data used to indicate that the first vCPU triggers the interrupt to the second vCPU into the first virtual register, where the information about the second vCPU is filled in a reserved bit of the virtual register, and the indication data includes data filled in a vector field, a delivery mode field, a destination mode field, a level field, a trigger mode field, and a destination shorthand field of the virtual register; and the VMM is specifically configured to obtain the information about the second vCPU from a reserved bit of the first virtual register by means of parsing, obtain the indication data from a vector field, a delivery mode field, a destination mode field, a level field, a trigger mode field, and a destination shorthand field of the first virtual register by means of parsing, and inject the inter-vCPU interrupt into the second vCPU according to the information about the second vCPU and the indication data, where the inter-vCPU interrupt includes the interrupt between the first vCPU and the second vCPU.

According to a fourth aspect, an embodiment of the present invention provides a computer system, including any one computing node included in the third aspect.

In the foregoing technical solutions, when a source vCPU needs to trigger an interrupt to a target vCPU, register data that includes information about the target vCPU and indication data used to indicate that the source vCPU triggers the interrupt to the target vCPU is written into a virtual register of a virtual advanced programmable interrupt controller vAPIC of the source vCPU, so that a virtual machine monitor obtains the information about the target vCPU and the indication data from the virtual register by means of parsing, and the virtual machine monitor injects an inter-vCPU interrupt into the target vCPU according to the information about the target vCPU and the indication data. In the foregoing interrupt process, it is required to perform one operation on the vAPIC only, that is, one interrupt causes only one VM-Exit, thereby improving performance of a virtual machine.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a schematic diagram of a scenario to which an embodiment of the present invention is applicable;

FIG. 2 is a schematic flowchart of a method for implementing an inter-vCPU interrupt according to an embodiment of the present invention;

FIG. 3 is a schematic flowchart of another method for implementing an inter-vCPU interrupt according to an embodiment of the present invention;

FIG. 4 and FIG. 5 are schematic diagrams of an optional register data according to an embodiment of the present invention;

DETAILED DESCRIPTION

Figure 5:
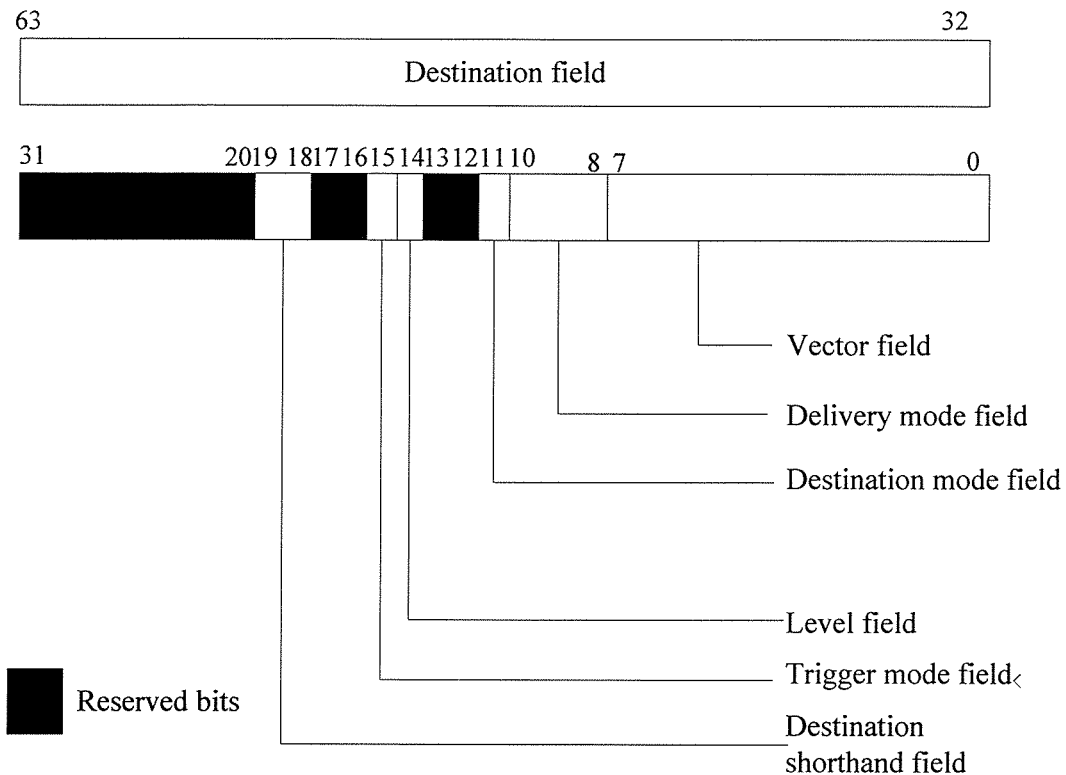

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make the embodiments of the present invention more comprehensible, a virtualization technology is first introduced. The virtualization technology is a decoupling technology that separates a lower-layer hardware device from an upper-layer operating system and an upper-layer application. As shown in FIG. 1, an application scenario of the virtualization technology includes a hardware layer 11, a virtual machine monitor (VMM) layer 12, and a virtual machine layer 13, where the hardware layer 11, the VMM layer 12, and the virtual machine layer 13 may be defined as follows:

Virtual machine (VM):

One or more virtual computers may be simulated on one physical computer by using virtual machine software, and these virtual machines work like real computers. An operating system and an application program may be installed on a virtual machine, and the virtual machine may also access a network resource. For an application that runs on the virtual machine, the virtual machine works likes areal computer.

Hardware layer:

The hardware layer refers to a hardware platform that runs in a virtualization environment. The hardware layer may include multiple types of hardware; for example, a hardware layer of a computing node may include a CPU and a memory, may further include other high-speed/low-speed input/output (I/O) devices, such as, a network adapter, a storage device, and may further include another device with a specific processing function; for example, an input/output memory management unit (IOMMU), where the IOMMU may be configured for translation between a virtual machine physical address and a host physical address.

Virtual machine monitor (VMM) (for example, a Hypervisor):

As a management layer, the VMM is configured to perform management and allocation of hardware resources, present a virtual hardware platform for virtual machines, and implement scheduling and isolation of the virtual machines. In addition, the VMM sometimes cooperates with a privileged virtual machine to form a host. The virtual hardware platform provides various hardware resources for virtual machines that run on the virtual hardware platform, for example, it provides a virtual CPU, a virtual memory, a virtual magnetic disk, and a virtual network adapter. The virtual magnetic disk may correspond to a file or a logical block device of the host. A virtual machine runs on a virtual hardware platform that is prepared by the VMM or the host for the virtual machine. One or more virtual machines run on the VMM or the host.

The interrupt in the embodiments of the present invention may specifically be any interrupt generated by accessing a virtual register of an APIC; for example, an IPI interrupt and other types of interrupts. These interrupts may specifically be applied to a scenario in which loads are balanced among a plurality of vCPUs; for example, an interrupt generated when a process is migrated from a waiting queue of one vCPU to that of another vCPU. The interrupt may also be an interrupt in a case in which after a vCPU receives a processing interrupt, the vCPU transfers the interrupt to another vCPU for processing.

In the embodiments of the present invention, an inter-vCPU interrupt may specifically be an IPI. The vCPU may specifically be a vCPU of a virtual machine, that is, a process or an interrupt processed by the vCPU may be equivalent to a process or an interrupt processed by the virtual machine. For example, a vCPU interrupt may be understood as an interrupt of the virtual machine in which the vCPU is located. In addition, in an SMP system, a corresponding vAPIC may be configured on each virtual machine; for example, a vLocal APIC.

FIG. 2 is a schematic flowchart of a method for implementing an inter-vCPU interrupt according to an embodiment of the present invention. As shown in FIG. 2, the method includes:

201. When a source vCPU needs to trigger an interrupt to a target vCPU, write register data that includes information about the target vCPU and indication data used to indicate that the source vCPU triggers the interrupt to the target vCPU into a virtual register of a vAPIC of the source vCPU, so that a virtual machine monitor obtains the information about the target vCPU and the indication data from the virtual register by means of parsing, and the virtual machine monitor injects an inter-vCPU interrupt into the target vCPU according to the information about the target vCPU and the indication data.

Optionally, step 201 may specifically be that, when the source vCPU is overloaded and needs to schedule some loads to the target vCPU in a balanced manner, or when the source vCPU receives an interrupt but does not want to perform the interrupt, the source vCPU triggers an interrupt to the target vCPU; or, when a command input by a user is received, where the command is used to instruct the source vCPU to trigger an interrupt to the target vCPU, or when a command sent by the VMM is received, where the command is used to instruct the source vCPU to trigger an interrupt to the target vCPU, a virtual inter-processor interrupt is triggered. No limitation is constituted in the embodiments of the present invention.

The foregoing register data may specifically be data used to be written into the virtual register of the vAPIC, where a format of the register data corresponds to a format of the virtual register. When the register data is written into the virtual register of the vAPIC, the virtual register stores the register data, so that the VH reads the register data and performs a related operation.

Optionally, the foregoing information of the target vCPU may specifically be information used to uniquely indicate the target vCPU, and may specifically be identifier data used to identify the target vCPU or information about the target vCPU (for example, a name, an identifier and like information about the target vCPU). In addition, the foregoing information of the target vCPU may specifically occupy one or more data bits of the foregoing register data, that is, when the information is written into the foregoing virtual register, the information occupies the one or more data bits of the virtual register. The foregoing indication data may specifically occupy one or more data bits of the foregoing register data, that is, when the indication data is written into the foregoing virtual register, the indication data occupies the one or more data bits of the virtual register.

Optionally, that the VMM injects the inter-vCPU interrupt into the target vCPU may specifically be that the VMM sends a command used to generate an inter-vCPU interrupt to the target vCPU, or the VMM sends a command used to generate an inter-vCPU interrupt to the target vCPU, and the target vAPIC controls the target vCPU to generate an inter-vCPU interrupt, or the VMM controls the target vCPU to generate an inter-vCPU interrupt.

Optionally, the foregoing target vCPU may specifically refer to one or more vCPUs. Information filled in the foregoing register data may also specifically be one or more pieces of information, that is, one piece of information corresponds to one vCPU. Certainly, one piece of information may also be used to identify one or more vCPUs. For example, the foregoing indication data includes destination mode data used to indicate a type of information, where the destination mode data may specifically be a 1-bit binary data; for example, when the destination mode data is 1, it indicates that the foregoing information of the target vCPU is used to identify a plurality of vCPUs; and when the destination mode data is 0, it indicates that the foregoing information of the target vCPU is used to identify one vCPU, which may specifically be as follows:

It is assumed that the SMP system includes eight vCPUs, the foregoing information of the target vCPU may be 8-bit binary data, and a mapping relationship between the 8-bit binary data and the eight vCPUs is preset. For example, the first bit binary data corresponds to the first vCPU, the second bit binary data corresponds to the second vCPU, and so on.

In this way, when the foregoing information of the target vCPU is 11000000, and the destination mode data is 1, the information is used to indicate the first vCPU and the second vCPU.

It is assumed that the SMP system includes eight vCPUs, the foregoing information of the target vCPU may be 8-bit binary data. The 8-bit binary data may indicate 256 values, and the SMP system includes eight vCPUs; in this case, a mapping relationship between eight pre-selected values of the 256 values and the foregoing eight vCPUs may be determined. For example, the smallest eight values 0-7 are selected, and then, the value 7 of the 8-bit binary data corresponds to the first vCPU, the value 6 of the 8-bit binary data corresponds to the second vCPU, and so on.

In this case, when the foregoing information of the target vCPU is 00000110, that is, when a value of 8-bit binary data is 6 and the destination mode data is 0, the information is used to indicate the second vCPU.

Certainly, the foregoing information of the target vCPU may also be 3-bit binary data, and the 3-bit binary data may indicate eight values, that is, a mapping relationship between the eight values and the foregoing eight vCPUs may be preset. For example, the value 7 of the 3-bit binary data corresponds to the first vCPU, the value 6 of the 3-bit binary data corresponds to the second vCPU, and so on.

In this case, when the foregoing information of the target vCPU is 110, that is, when a value of the 3-bit binary data is 6, and the destination mode data is 0, the information is used to indicate the second vCPU.

In another embodiment, the foregoing virtual register is a high-order register or a low-order register of a virtual interrupt command register vICR; and a step 201 may specifically include:

when the source vCPU needs to trigger the interrupt to the target vCPU, writing register data that includes the information about the target vCPU, the indication data used to indicate that the source vCPU triggers the interrupt to the target vCPU, and optimization data into the virtual register of the vAPIC of the source vCPU, where the optimization data is filled in a reserved bit of the virtual register, and the optimization data is used to instruct the VMM to obtain the information about the target vCPU and the indication data from the virtual register by means of parsing.

The foregoing optimization data may specifically be a one-bit binary data or a multi-bit binary data. For example, the foregoing optimization data is "1", which indicates that the VMM obtains the information about the target vCPU and the indication data from the virtual register by means of parsing.

In this embodiment, because the foregoing optimization data is added, it can be implemented that, when the foregoing register data includes the optimization data, the manner of implementing an interrupt by the VMM proceeds according to the manner of implementing an interrupt in this method; and when the foregoing register data does not include the optimization data, the manner of implementing an interrupt by the VMM may use the manner in the prior art to implement an interrupt, so as to ensure that the register data or the foregoing virtual register in this embodiment can be compatible with different VMMs.

In another embodiment, the step 201 may specifically include: when the source vCPU needs to trigger the interrupt to the target vCPU, writing the register data that includes the information about the target vCPU and the indication data used to indicate that the source vCPU triggers the interrupt to the target vCPU into the virtual register of the vAPIC of the source vCPU, where the information about the target vCPU is filled in a reserved bit of the virtual register, and the indication data includes data filled in a vector field, a delivery mode field, a destination mode field, a level field, a trigger mode field, and a destination shorthand field of the virtual register.

That the foregoing indication data includes data filled in a vector field, a delivery mode field, a destination mode field, a level field, a trigger mode field, and a destination shorthand field of the virtual register may specifically refer to that the indication data is data used to be filled in the vector field, the delivery mode field, the destination mode field, the level field, the trigger mode field, and the destination shorthand field of the virtual register.

Optionally, that the foregoing register data include the information about the target vCPU and the indication data may specifically be that the information and the indication data are filled in the register data before the step 201 is performed; or may further be that the information is filled in the registered data before the step 201 is performed, and the indication data is filled in the register data in a process of performing the step 201; or the information and the indication data are filled in the register data in a process of performing the step 201. This embodiment sets no limitation thereto.

Optionally, the foregoing method may specifically be applied to a virtual machine. By perform the step 201, the register data is written into the virtual register of the vAPIC, so as to cause a VM-Exit, that is, the virtual machine performs a context switching between the virtual machine and the VMM. After the foregoing VMM obtains the information about the target vCPU and the indication data from the virtual register by means of parsing, the VMM may inject the inter-vCPU interrupt into the target vCPU according to the information about the target vCPU and the indication data. In this way, in a process of implementing an interrupt, the foregoing virtual machine causes only one VM-Exit, thereby improving performance of the virtual machine.

Optionally, the foregoing vAPIC may specifically be a vLocal APIC of the foregoing virtual machine.

In the foregoing technical solutions, when a source vCPU needs to trigger an interrupt to a target vCPU, register data that includes information about the target vCPU and indication data used to indicate that the source vCPU triggers the interrupt to the target vCPU is written into a virtual register of a virtual advanced programmable interrupt controller vAPIC of the source vCPU, so that a virtual machine monitor obtains the information about the target vCPU and the indication data from the virtual register by means of parsing, and the virtual machine monitor injects an inter-vCPU interrupt into the target vCPU according to the information about the target vCPU and the indication data.

In this way, one interrupt requires only one operation on the vAPIC, that is, one interrupt causes only one VM-Exit, thereby improving performance of a virtual machine.

FIG. 3 is a schematic flowchart of another method for implementing an inter-vCPU interrupt according to an embodiment of the present invention. As shown in FIG. 3, the method includes:

301. When a source vCPU needs to trigger an interrupt to a target vCPU, write register data that includes information about the target vCPU and indication data used to indicate that the source vCPU triggers the interrupt to the target vCPU into a high-order register or a low-order register of a vICR of a vAPIC of the source vCPU, so that a virtual machine monitor obtains the information about the target vCPU and the indication data from the high-order register or the low-order register by means of parsing, and the virtual machine monitor injects an inter-vCPU interrupt into the target vCPU according to the information about the target vCPU and the indication data.

In this way, by performing only one operation, the foregoing information about the target vCPU and the indication data may be written into the high-order register or the low-order register of the vICR, so that only one VM-Exit is caused in one interrupt process.

Optionally, the foregoing vICR may specifically be a 64-bit virtual register, and high 32 bits in the foregoing vICR are the foregoing high-order register and the low 32 bits are the low-order register, that is, the foregoing register data is 32-bit register data corresponding to the high-order register. In the high-order register of the vICR shown in FIG. 4, data bits 56 to 63 are a destination field, and data bits 32 to 55 are reserved bits; and in the low-order register of the vICR, bit 0 to bit 7 are a vector field, bit 8 to bit 10 are a delivery mode field, bit 11 is a destination mode field, bit 12 is a delivery status field, bit 13 is a reserved bit, bit 14 is a level field, bit 15 is a trigger mode field, bit 16 and bit 17 are reserved bits, bit 18 and bit 19 are a destination shorthand field, and bit 20 to bit 31 data are reserved bits. In the high-order register of the vICR shown in FIG. 5, data bits 32 to 63 are a destination field; and in the low-order register of the vICR, bit 0 to bit 7 are a vector field, bit 8 to bit 10 are a delivery mode field, bit 11 is a destination mode field, bit 12 and bit 13 are reserved bits, bit 14 is a level field, bit 15 is a trigger mode field, bit 16 and bit 17 are reserved bits, bit 18 and bit 19 are a destination shorthand field, and bit 20 to bit 31 data are reserved bits. All fields included in the foregoing high-order register and the foregoing low-order register may use fields defined by the vICR in the prior art, which is not described in detail herein again.

Optionally, that the foregoing writing register data that includes information about the target vCPU and indication data used to indicate that the source vCPU triggers the interrupt to the target vCPU into a high-order register or a low-order register of a vICR of a vAPIC of the source vCPU may specifically include:

writing the register data that includes the information about the target vCPU and the indication data used to indicate that the source vCPU triggers the interrupt to the target vCPU into the low-order register of the vICR of the vAPIC of the source vCPU, where the information about the target vCPU is filled in a reserved bit of the low-order register.

For example, as shown in FIG. 4, the foregoing information of the target vCPU is filled in a reserved bit of bit 20 to bit 31, bit 16 to bit 17, or bit 13 of the low-order register, while the foregoing indication data is filled in the vector field at bit 0 to bit 7, the delivery mode field at bit 8 to bit 10, the destination mode field at bit 11, the delivery status field at bit 12, the level field at bit 14, the trigger mode field at bit 15, and the destination shorthand field at bit 18 and bit 19 of the low-order register, that is, the foregoing indication data may include data filled in the vector field, the delivery mode field, the destination mode field, the delivery status field, the level field, the trigger mode field, and the destination shorthand field of the foregoing low-order register.

For example, as shown in FIG. 5, the foregoing information of the register data is filled in a reserved bit of bit 20 to bit 31, bit 16 and bit 17, or bit 12 to bit 13 of the low-order register, while the foregoing indication data is filled in the vector field at bit 0 to bit 7, the delivery mode field at bit 8 to bit 10, the destination mode field at bit 11, the level field at bit 14, the trigger mode field at bit 15, and the destination shorthand field at bit 18 and bit 19 of the low-order register, that is, the foregoing indication data may include data filled in the vector field, the delivery mode field, the destination mode field, the level field, the trigger mode field, and the destination shorthand field of the foregoing low-order register.

Optionally, that the foregoing writing register data that includes information about the target vCPU and indication data used to indicate that the source vCPU triggers the interrupt to the target vCPU into a high-order register or a low-order register of a vICR of a vAPIC of the source vCPU may specifically include:

writing the register data that includes the information about the target vCPU and the indication data used to indicate that the source vCPU triggers the interrupt to the target vCPU into the high-order register of the vICR of the vAPIC of the source vCPU, where the indication data is filled in a reserved bit of the high-order register.

For example, as shown in FIG. 4, the foregoing information of the register data is filled in a destination field at bit 56 to bit 63 of the high-order register, and the foregoing indication data is filled in a reserved bit of bit 32 to bit 55 of the high-order register.

Optionally, the step 301 may specifically include:

when the source vCPU needs to trigger the interrupt to the target vCPU, writing register data that includes the information about the target vCPU, the indication data used to indicate that the source vCPU triggers the interrupt to the target vCPU, and optimization data into the high-order register or the low-order register of the vICR of the vAPIC of the source vCPU, where the optimization data is filled in a reserved bit of the high-order register or the low-order register, and the optimization data is used to instruct the VMM to obtain the information about the target vCPU and the indication data from the virtual register by means of parsing.

In this way, it may be implemented that the foregoing register data and the foregoing virtual register are compatible with different virtual machine monitors.

Optionally, it may be concluded from the foregoing analysis that the register data shown in FIG. 5 has one more reserved bit, that is, bit 12, than the register data shown in FIG. 4, while bit 12 of the register data shown in FIG. 4 is the delivery status field. In this way, when the register data shown in FIG. 5 is used, in a process of implementing an interrupt in this embodiment, the delivery status of the vICR does not need to be read, and step 301 is directly performed. When the register data shown in FIG. 4 is used, in a process of implementing an interrupt in this embodiment, a delivery status of the vICR may further be read before the step 301 is performed, and then the step 301 is performed according to the delivery status. That is, before the step 301 is performed, the method may include: reading a delivery status in the vICR.

The step 301 may specifically include: when the source vCPU needs to trigger the interrupt to the target vCPU, writing, according to the delivery status, the register data that includes the information about the target vCPU and the indication data used to indicate that the source vCPU triggers the interrupt to the target vCPU into the high-order register or the low-order register of the vICR of the vAPIC of the source vCPU.

It should be noted that, in an actual application, the delivery status of the vICR is an idle state. Therefore, this embodiment may also be implemented without performing the reading a delivery status in the vICR, and one VM-Exit may be spared.

In the foregoing technical solutions, when a source vCPU needs to trigger an interrupt to a target vCPU, register data that includes information about the target vCPU and indication data used to indicate that the source vCPU triggers the interrupt to the target vCPU is written into a high-order register or a low-order register of a vICR of a vAPIC of the source vCPU. In this way, one interrupt requires only one operation on the vAPIC, that is, one interrupt causes only one VM-Exit, thereby improving performance of a virtual machine. In addition, because the foregoing register data is written into the vICR, and the vICR is a virtual register specifically configured to control an interrupt, a VMM may quickly inject an inter-vCPU interrupt into the target vCPU.

The following are apparatus embodiments of the present invention. The apparatus embodiments of the present invention are used to perform the methods to implement method embodiments of the present invention. For convenience of description, parts related to the embodiments of the present invention are mainly described. For undisclosed technical details, reference may be made to Embodiment 1 and Embodiment 2 of the present invention.

Figure 6:
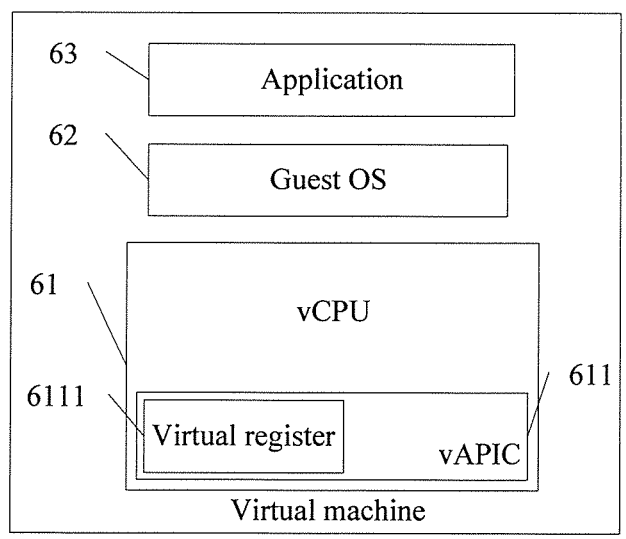
FIG. 6 is a schematic structural diagram of a virtual machine according to an embodiment of the present invention.

FIG. 6 is a schematic structural diagram of a virtual machine according to an embodiment of the present invention. As shown in FIG. 6, the virtual machine includes one or more vCPUs 61, where the vCPUs 61 includes a vAPIC 611, and the vAPIC 611 includes a virtual register 6111, where:

a current vCPU 61 of the one or more vCPUs 61 is configured to:

when the current vCPU 61 needs to trigger an interrupt to a target vCPU, write register data that includes information about the target vCPU and indication data used to indicate that the current vCPU 61 triggers the interrupt to the target vCPU into a virtual register 6111 of the vAPIC 611 of the current vCPU, so that a virtual machine monitor obtains the information about the target vCPU and the indication data from the virtual register 6111 by means of parsing, and the virtual machine monitor injects an inter-vCPU interrupt into the target vCPU according to the information about the target vCPU and the indication data.

Optionally, the vCPU 61 writes register data to the virtual register 6111 of the vAPIC 611, so as to cause a VM-Exit, that is, a virtual machine performs a context switching between the virtual machine and the VMM (for example, a Hypervisor). After the foregoing VMM obtains the information about the target vCPU and the indication data from the virtual register 6111 by means of parsing, the VMM may inject the inter-vCPU interrupt into the target vCPU according to the information about the target vCPU and the indication data. In this way, in a process of implementing an interrupt, the foregoing virtual machine causes only one VM-Exit, thereby improving performance of the virtual machine.

Optionally, during the foregoing operation of writing register data that includes information about the target vCPU and indication data used to indicate that the current vCPU 61 triggers the interrupt to the target vCPU into a virtual register 6111 of a vAPIC 611 of the current vCPU, the current vCPU is specifically configured to:

write register data that includes the information about the target vCPU, the indication data used to indicate that the current vCPU 61 triggers the interrupt to the target vCPU, and optimization data into a virtual register 6111 of the vAPIC 611 of the current vCPU 61, where the optimization data is filled in a reserved bit of the virtual register 6111, and the optimization data is used to instruct the VMM to obtain the information about the target vCPU and the indication data from the virtual register by means of parsing.

In this way, by using the foregoing optimization data, compatibility of the foregoing register data or the foregoing virtual register can be improved.

Optionally, during the foregoing operation of writing register data that includes information about the target vCPU and indication data used to indicate that the current vCPU 61 triggers the interrupt to the target vCPU into a virtual register 6111 of a vAPIC 611 of the current vCPU, the current vCPU is specifically configured to:

write the register data that includes the information about the target vCPU and the indication data used to indicate that the current vCPU 61 triggers the interrupt to the target vCPU into a virtual register 611 of the vAPIC 611 of the current vCPU 61, where the information about the target vCPU is filled in the reserved bit of the virtual register 6111, and the indication data includes data filled in a vector field, a delivery mode field, a destination mode field, a level field, a trigger mode field, and a destination shorthand field of the virtual register 6111.

Optionally, the foregoing vAPIC 611 may specifically be a vLocal APIC of the foregoing virtual machine.

Optionally, an operating subsystem (Guest OS) 62 and an application 63 also run on the virtual machine, where:

the operating subsystem (Guest OS) 62 is configured to run the application 63; and the application 63 is configured to perform a service in the virtual machine.

Optionally, the foregoing target vCPU may be a vCPU of the virtual machine, and may also be a vCPU of another virtual machine.

In the foregoing technical solutions, when a current vCPU needs to trigger an interrupt to a target vCPU, register data that includes information about the target vCPU and indication data used to indicate that the current vCPU triggers an interrupt to the target vCPU is written into a virtual register of a vAPIC of the current vCPU, so that a virtual machine monitor obtains the information about the target vCPU and the indication data from the virtual register by means of parsing, and the virtual machine monitor injects an inter-vCPU interrupt into the target vCPU according to the information about the target vCPU and the indication data. In this way, one interrupt requires only one operation on the vAPIC, that is, one interrupt causes only one VM-Exit, thereby improving performance of a virtual machine.

Figure 7:
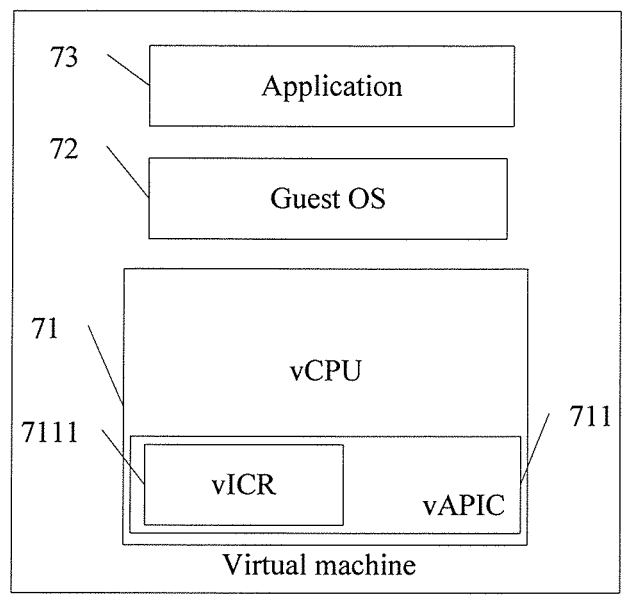
FIG. 7 is a schematic structural diagram of another virtual machine according to an embodiment of the present invention.

FIG. 7 is a schematic structural diagram of another virtual machine according to an embodiment of the present invention. As shown in FIG. 7, the virtual machine includes one or more vCPUs 71, where the vCPUs 71 includes a vAPIC 711, and the vAPIC 711 includes a vICR 7111, where:

a current vCPU 71 of the one or more vCPUs 71 is configured to:

when the current vCPU 71 needs to trigger an interrupt to a target vCPU, write register data that includes information about the target vCPU and indication data used to indicate that the current vCPU 71 triggers the interrupt to the target vCPU into a high-order register or a low-order register of the vICR 7111 of the vAPIC 711 of the current vCPU 71, so that a VMM obtains the information about the target vCPU and the indication data from the high-order register or the low-order register by means of parsing, and the VMM injects an inter-vCPU interrupt into the target vCPU according to the information about the target vCPU and the indication data.

Optionally, for structures of the high-order register and the low-order register included in the foregoing vICR 7111, reference may be made to the register structures shown in FIG. 4 and FIG. 5, which are not further described herein.

Optionally, during the foregoing operation of writing register data that includes information about the target vCPU and indication data used to indicate that the current vCPU 71 triggers the interrupt to the target vCPU into a high-order register or a low-order register of the vICR 7111 of the vAPIC 711 of the current vCPU 71, the current vCPU 71 may specifically be configured to:

write the register data that includes the information about the target vCPU and the indication data used to indicate that the current vCPU 71 triggers the interrupt to the target vCPU into the low-order register of the vICR 7111 of the vAPIC 711 of the current vCPU 71, where the information about the target vCPU is filled in a reserved bit of the low-order register.

For example, as shown in FIG. 4, the foregoing information of the register data is filled in a reserved bit of bit 20 to bit 31, bit 16 to bit 17, or bit 13 of the low-order register, while the foregoing indication data is filled in a vector field at bit 0 to bit 7, a delivery mode field at bit 8 to bit 10, a destination mode field at bit 11, a delivery status field at bit 12, a level field at bit 14, a trigger mode field at bit 15, and a destination shorthand field at bit 18 and bit 19 of the low-order register, that is, the foregoing indication data may include data filled in the vector field, the delivery mode field, the destination mode field, the delivery status field, the level field, the trigger mode field, and the destination shorthand field of the foregoing low-order register.

For example, as shown in FIG. 5, the foregoing information of the register data is filled in a reserved bit of bit 20 to bit 31, bit 16 and bit 7, or bit 12 to bit 13 of the low-order register, while the foregoing indication data is filled in the vector field at bit 0 to bit 7, the delivery mode field at bit 8 to bit 10, the destination mode field at bit 11, the level field at bit 14, the trigger mode field at bit 15, and the destination shorthand field at bit 18 and bit 19 of the low-order register, that is, the foregoing indication data may include data filled in the vector field, the delivery mode field, the destination mode field, the level field, the trigger mode field, and the destination shorthand field of the foregoing low-order register.

Optionally, during the foregoing operation of writing register data that includes information about the target vCPU and indication data used to indicate that the current vCPU 71 triggers the interrupt to the target vCPU into a high-order register or a low-order register of the vICR 7111 of the vAPIC 711 of the current vCPU 71, the current vCPU 71 may specifically be configured to:

write the register data that includes the information about the target vCPU and the indication data used to indicate that the current vCPU 71 triggers the interrupt to the target vCPU into the high-order register of the vICR 7111 of the vAPIC 711 of the current vCPU 71, where the indication data is filled in a reserved bit of the high-order register.

For example, as shown in FIG. 4, the information included in the foregoing register data is filled in a destination field at bit 56 to bit 63 of the high-order register, and the foregoing indication data is filled in a reserved bit of bit 32 to bit 55 of the high-order register.

Optionally, during the foregoing operation of writing register data that includes information about the target vCPU and indication data used to indicate that the current vCPU 71 triggers the interrupt to the target vCPU into a high-order register or a low-order register of the vICR 7111 of the vAPIC 711 of the current vCPU 71, the current vCPU 71 may specifically be configured to:

write register data that includes the information about the target vCPU, the indication data used to indicate that the current vCPU 71 triggers the interrupt to the target vCPU, and optimization data into the high-order register or the low-order register of the vICR 7111 of the vAPIC 711 of the current vCPU 71, where the optimization data is filled in a reserved bit of the high-order register or the low-order register, and the optimization data is used to instruct the VMM to obtain the information about the target vCPU and the indication data from the virtual register by means of parsing.

In this way, it may be implemented that the foregoing register data is compatible with different virtual machine monitors.

Optionally, when the register data shown in FIG. 4 is used, in a process of implementing an interrupt in this embodiment, before the current vCPU 71 performs the operation of writing register data that includes information about the target vCPU and indication data used to indicate that the current vCPU 71 triggers the interrupt to the target vCPU into a high-order register or a low-order register of the vICR 7111 of the vAPIC 711 of the current vCPU 71, the current vCPU 71 may be further configured to:

read a delivery status in the vICR.

During the foregoing operation of writing register data that includes information about the target vCPU and indication data used to indicate that the current vCPU 71 triggers the interrupt to the target vCPU into a high-order register or a low-order register of the vICR 7111 of the vAPIC 711 of the current vCPU 71, the current vCPU 71 may specifically be configured to:

write, according to the delivery status, the register data that includes the information about the target vCPU and the indication data used to indicate that the current vCPU 71 triggers the interrupt to the target vCPU into the high-order register or the low-order register of the vICR 7111 of the vAPIC 711 of the current vCPU 71.

It should be noted that, in an actual application, the delivery status of the vICR is an idle state. Therefore, this embodiment may also be implemented without performing the reading a delivery status in the vICR, and one VM-Exit may be spared.

Optionally, an operating subsystem (Guest OS) 72 and an application 73 also run on the virtual machine, where:

the operating subsystem (Guest OS) 72 is configured to run the application 73; and the application 73 is configured to perform a service in the virtual machine.

In the foregoing technical solutions, when a current vCPU needs to trigger an interrupt to a target vCPU, register data that includes information about the target vCPU and indication data used to indicate that the current vCPU triggers the interrupt to the target vCPU is written into a high-order register or a low-order register of a vICR of a vAPIC of the current vCPU, so that a VMM obtains the information about the target vCPU and the indication data from the high-order register or the low-order register by means of parsing, and the VMM injects an inter-vCPU interrupt into the target vCPU according to the information about the target vCPU and the indication data. In this way, one interrupt requires only one operation on the vAPIC, that is, one interrupt causes only one VM-Exit, thereby improving performance of a virtual machine. In addition, because the foregoing register data is written into the vICR, and the vICR is a virtual register specially configured to control an interrupt, the VMM may quickly inject an inter-vCPU interrupt into the target vCPU.

Figure 8:
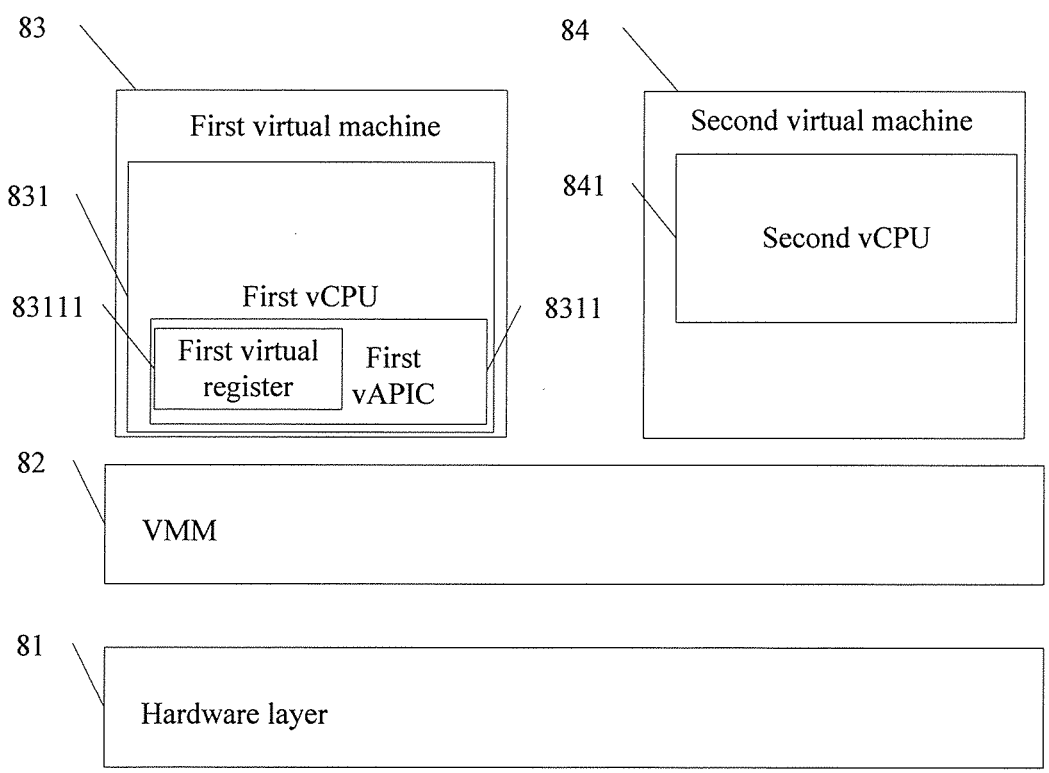
FIG. 8 is a schematic structural diagram of a computing node according to an embodiment of the present invention.

FIG. 8 is a schematic structural diagram of a computing node according to an embodiment of the present invention. As shown in FIG. 8, the computing node includes a hardware layer 81, a VMM 82 that runs at the hardware layer 81, and at least two virtual machine that runs on the VMM 82, where the at least two virtual machine VM includes a first virtual machine 83 and a second virtual machine 84, the first virtual machine 83 includes a first vCPU 831, the first vCPU 831 includes a first vAPIC 8311, and the first vAPIC 8311 includes a first virtual register 8311; and the second virtual machine 84 includes a second vCPU 841, where:

the hardware layer 81 is configured to provide a hardware platform for the VMM 82, the first virtual machine 83, and the second virtual machine 84 to run in a virtualization environment, where the hardware layer 81 may include multiple types of hardware; for example, a hardware layer of a computing node may include a CPU and a memory, may further include other high-speed/low-speed input/output (I/O) devices, such as, a network adapter, a storage device, and another device with a specific processing function, for example, an IOMMU, where the IOMMU may be configured for translation between a virtual machine physical address and a host physical address;

the first vCPU 831 is configured to: when the first vCPU 831 needs to trigger an interrupt to the second vCPU 841, write the register data that includes information about the second vCPU 841 and indication data used to indicate that the first vCPU 831 triggers the interrupt to the second vCPU 841 into the first virtual register 83111; and the VMM 82 is configured to obtain the information about the second vCPU and the indication data from the first virtual register 83111 by means of parsing, and inject an inter-vCPU interrupt into the second vCPU 841 according to the information about the second vCPU and the indication data, where the inter-vCPU interrupt includes an interrupt between the first vCPU 831 and the second vCPU 841.

Optionally, when another virtual machine (for example, a third virtual machine) runs on the foregoing VMM, an inter-vCPU interrupt between the foregoing first vCPU 831 and the another virtual machine (for example, the third virtual machine) may also be implemented in this embodiment. For a specific implementation process, reference may be made to the process of implementing an interrupt between the first vCPU and the second vCPU, which is not further described herein.

Optionally, the foregoing first virtual register 83111 is a vICR, where the vICR includes a high-order register and a low-order register. For structures of the high-order register and the low-order register, reference may be made to FIG. 4 and FIG. 5.

Optionally, the first vCPU 831 may specifically be configured to: when the first vCPU 831 needs to trigger an interrupt to the second vCPU, write the register data that includes the information about the second vCPU 841 and the indication data used to indicate that the first vCPU 831 triggers the interrupt to the second vCPU 841 into the high-order register or low-order register; and the VMM 82 may specifically be configured to obtain the information about the second vCPU 841 and the indication data from the high-order register or the low-order register by means of parsing, and inject the inter-vCPU interrupt into the second vCPU 841 according to the information about the second vCPU 841 and the indication data, where the inter-vCPU interrupt includes the interrupt between the first vCPU 831 and the second vCPU 841.

Optionally, the first vCPU 831 is specifically configured to: when the first vCPU 831 needs to trigger the interrupt to the second vCPU 841, write the register data that includes the information about the second vCPU 841 and the indication data used to indicate that the first vCPU 831 triggers the interrupt to the second vCPU 841 into the low-order register, where the information about the second vCPU 841 is filled in a reserved bit of the low-order register; and the VMM 82 is specifically configured to obtain the information about the second vCPU 841 from the reserved bit of the low-order register by means of parsing, obtain the indication data from the low-order register by means of parsing, and inject the inter-vCPU interrupt into the second vCPU 841 according to the information about the second vCPU 841 and the indication data, where the inter-vCPU interrupt includes the interrupt between the first vCPU 831 and the second vCPU 841.

The indication data may include data filled in a vector field, a delivery mode field, a destination mode field, a level field, a trigger mode field, and a destination shorthand field of the virtual register.

Optionally, the first vCPU 831 is specifically configured to: when the first vCPU 831 needs to trigger the interrupt to the second vCPU 841, write the register data that includes the information about the second vCPU 841 and the indication data used to indicate that the first vCPU 831 triggers the interrupt to the second vCPU 841 into the high-order register, where the indication data is filled in a reserved bit of the high-order register; and the VMM 82 is specifically configured to obtain the indication data from the reserved bit of the high-order register by means of parsing, obtain the information about the second vCPU 841 from the high-order register by means of parsing, and inject the inter-vCPU interrupt into the second vCPU 841 according to the information about the second vCPU 841 and the indication data, where the inter-vCPU interrupt includes the interrupt between the first vCPU 831 and the second vCPU 841.

Optionally, the first vCPU 831 may specifically be configured to: when the first vCPU 831 needs to trigger the interrupt to the second vCPU 841, write register data that includes the information about the second vCPU 841, the indication data used to indicate that the first vCPU 831 triggers the interrupt to the second vCPU 841, and optimization data into the first virtual register 83111, where the optimization data is filled in a reserved bit of the first virtual register 83111, and the optimization data is used to instruct the VMM to obtain the information about the second vCPU and the indication data from the first virtual register 83111 by means of parsing; and the VMM may specifically be configured to obtain the optimization data from the first virtual register 83111 by means of parsing, obtain the information about the second vCPU and the indication data from the first virtual register 83111 by means of parsing according to the optimization data, and inject the inter-vCPU interrupt into the second vCPU 841 according to the information about the second vCPU and the indication data, where the inter-vCPU interrupt includes the interrupt between the first vCPU 831 and the second vCPU 841.

Optionally, the first vCPU 831 may specifically be configured to: when the first vCPU 831 needs to trigger the interrupt to the second vCPU, write the register data that includes the information about the second vCPU 841 and the indication data used to indicate that the first vCPU 831 triggers the interrupt to the second vCPU 841 into the first virtual register 83111, where the information about the second vCPU is filled in a reserved bit of the first virtual register 83111, and the indication data includes data filled in a vector field, a delivery mode field, a destination mode field, a level field, a trigger mode field, and a destination shorthand field of the virtual register; and the VMM 82 may specifically be configured to obtain the information about the second vCPU from the reserved bit of the first virtual register 83111 by means of parsing, obtain the indication data from the vector field, the delivery mode field, the destination mode field, the level field, the trigger mode field, and the destination shorthand field of the first virtual register 83111 by means of parsing, and inject the inter-vCPU interrupt into the second vCPU 841 according to the information about the second vCPU and the indication data, where the inter-vCPU interrupt includes the interrupt between the first vCPU 831 and the second vCPU 841.

In the foregoing technical solutions, when a first vCPU needs to trigger an interrupt to a second vCPU, register data that includes information about the second vCPU and indication data used to indicate that the first vCPU triggers the interrupt to the second vCPU is written into the first virtual register; the VMM obtains the information about the second vCPU and the indication data from the first virtual register by means of parsing, and injects an inter-vCPU interrupt into the second vCPU according to the information about the second vCPU and the indication data, where the inter-vCPU interrupt includes an interrupt between the first vCPU and the second vCPU. In this way, one interrupt requires only one operation on the vAPIC, that is, one interrupt causes only one VM-Exit, thereby improving performance of a virtual machine.

Figure 9:
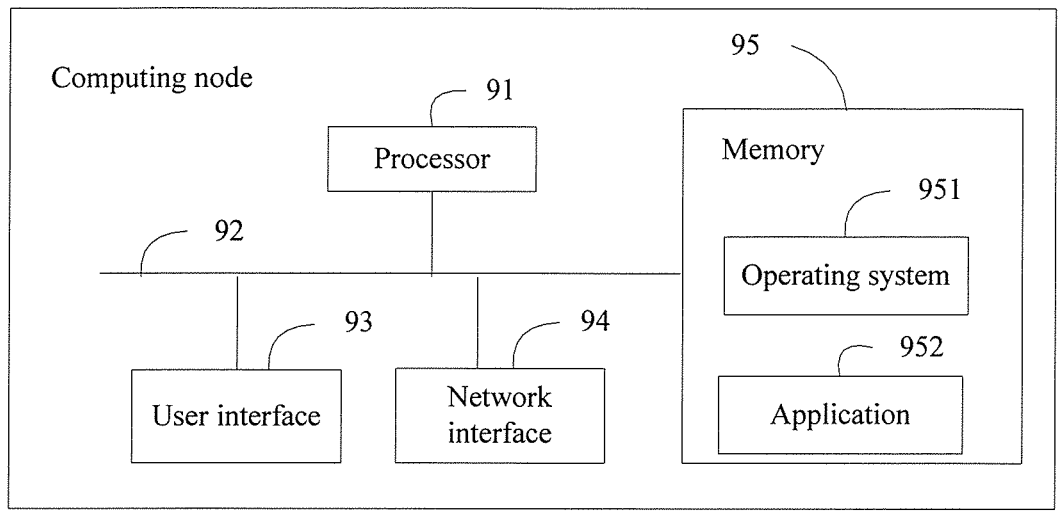
FIG. 9 is a schematic structural diagram of a computer system according to an embodiment of the present invention.

FIG. 9 is a schematic structural diagram of another computing node 90 according to an embodiment of the present invention. As shown in FIG. 9, the computing node 90 includes at least one processor 91; for example, a CPU, at least one network interface 92 or another other user interface 93, a memory 95, and at least one communication bus 92. The communication bus 92 is configured to implement connections and communication between these components. The computing node 90 optionally includes a user interface 93, including a display, a keyboard or a clicking device (for example, a mouse, a trackball, a touch panel or a touchscreen). The memory 95 may include a high-speed RAM memory, and may also include a non-volatile memory; for example, at least one magnetic disk memory. The memory 605 may optionally include at least one storage apparatus located far away from the foregoing processor 91.

In some implementation manners, the memory 95 stores the following elements: an executable module or a data structure, or a subset thereof or an extension set thereof:

an operating system 951, including various system programs and configured to implement various basic services and process a hardware-based task; and an application module 952, including various applications and configured to implement various application services.

The application module 952 includes but is not limited to one or more vCPUs 61, where the vCPU 61 includes a vAPIC 611, and the vAPIC 611 includes a virtual register 6111.

For specific implementation of modules in the application module 952, reference may be made to the corresponding modules in the embodiments shown in FIG. 7 and FIG. 8. Details are not described herein again.

In this embodiment of the present invention, by calling a program or an instruction stored in the memory 95, the processor 91 is configured to:

when a source vCPU needs to trigger an interrupt to a target vCPU, write register data that includes information about the target vCPU and indication data used to indicate that the source vCPU triggers the interrupt to the target vCPU into a virtual register of a virtual advanced programmable interrupt controller vAPIC of the source vCPU, so that a virtual machine monitor obtains the information about the target vCPU and the indication data from the virtual register by means of parsing, and the virtual machine monitor injects an inter-vCPU interrupt into the target vCPU according to the information about the target vCPU and the indication data.

In this embodiment, the processor 91 is further configured to:

when the source vCPU needs to trigger the interrupt to the target vCPU, write the register data that includes the information about the target vCPU and the indication data used to indicate that the source vCPU triggers the interrupt to the target vCPU into a high-order register or a low-order register of a vICR of the vAPIC of the source vCPU, so that the VMM obtains the information about the target vCPU and the indication data from the high-order register or the low-order register by means of parsing, and the VMM injects the inter-vCPU interrupt into the target vCPU according to the information about the target vCPU and the indication data.

Optionally, the operation, performed by the processor 91, of writing the register data that includes the information about the target vCPU and the indication data used to indicate that the source vCPU triggers the interrupt to the target vCPU into a high-order register or a low-order register of a vICR of the vAPIC of the source vCPU, may include:

writing the register data that includes the information about the target vCPU and the indication data used to indicate that the source vCPU triggers the interrupt to the target vCPU into the low-order register of the vICR of the vAPIC of the source vCPU, where the information about the target vCPU is filled in a reserved bit of the low-order register.

Optionally, the operation, performed by the processor 91, of writing the register data that includes the information about the target vCPU and the indication data used to indicate that the source vCPU triggers the interrupt to the target vCPU into a high-order register or a low-order register of a vICR of the vAPIC of the source vCPU, may include:

writing the register data that includes the information about the target vCPU and the indication data used to indicate that the source vCPU triggers the interrupt to the target vCPU into the high-order register of the vICR of the vAPIC of the source vCPU, where the indication data is filled in a reserved bit of the high-order register.

In each of the foregoing embodiments, further, the processor 91 is further configured to:

when the source vCPU needs to trigger the interrupt to the target vCPU, write register data that includes the information about the target vCPU, the indication data used to indicate that the source vCPU triggers the interrupt to the target vCPU, and optimization data into the virtual register of the vAPIC of the source vCPU, where the optimization data is filled in a reserved bit of the virtual register, and the optimization data is used to instruct the VMM to obtain the information about the target vCPU and the indication data from the virtual register by means of parsing, so that the VMM obtains, according to the optimization data, the information about the target vCPU and the indication data from the virtual register by means of parsing, and the VMM injects the inter-vCPU interrupt into the target vCPU according to the information about the target vCPU and the indication data.

In each of the foregoing embodiments, further, the processor 91 is further configured to:

when the source vCPU needs to trigger the interrupt to the target vCPU, write the register data that includes the information about the target vCPU and the indication data used to indicate that the source vCPU triggers the interrupt to the target vCPU into the virtual register of the vAPIC of the source vCPU, where the information about the target vCPU is filled in the reserved bit of the virtual register, and the indication data includes data filled in a vector field, a delivery mode field, a destination mode field, a level field, a trigger mode field, and a destination shorthand field of the virtual register, so that the VMM obtains the information about the target vCPU and the indication data from the virtual register by means of parsing, and the VMM injects the inter-vCPU interrupt into the target vCPU according to the information about the target vCPU and the indication data.

Evidently, by using the foregoing solutions, one interrupt requires only one operation on the vAPIC, that is, one interrupt causes only one VM-Exit, thereby improving performance of a virtual machine. In addition, if the foregoing register data is written into a virtual register, because an interrupt command register is a virtual register specially configured to control an interrupt, the VMM may quickly inject an inter-vCPU interrupt into the target vCPU.

Figure 10:
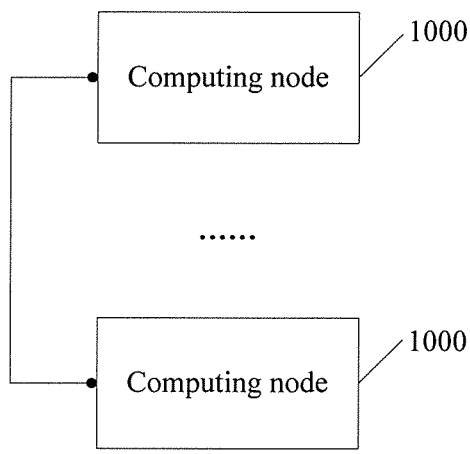
FIG. 10 is a schematic structural diagram of another computing node according to an embodiment of the present invention.

FIG. 10 is a schematic structural diagram of a computer system according to an embodiment of the present invention. As shown in FIG. 10, the computer system may include at least one computing node 1000.

For a description of the computing node provided by this embodiment of the present invention, reference may be made to the foregoing embodiments, which is not further described herein.

In conclusion, in this embodiment of the present invention, an interrupt process requires only one operation on the vAPIC, that is, one interrupt causes only one VM-Exit, so that performance of a virtual machine may be improved. In addition, because the foregoing register data is written into a vICR, and the vICR is a virtual register specifically configured to control an interrupt, the VMM may quickly inject an inter-vCPU interrupt into the target vCPU. In addition, in this embodiment of the present invention, information is filled in a reserved bit of the register data, so that in a process of executing this method, an existing function of the register data is not modified. Furthermore, in this embodiment of the present invention, optimization data is added to the register data, so that compatibility of the register data and the virtual register may be improved.

Specifically, to overcome a problem in the prior art where an IPI interrupt is a common system interrupt and a VM-Exit is caused by accessing to a virtual register of an APIC during processing of the IPI interrupt, so that performance of a virtual machine deteriorates. In an implementation manner, an embodiment of the present invention combines three accesses to the APIC into one by using an extension bit of a virtual APIC, so as to reduce the number of APIC access times and achieve an effect of optimizing performance of the IPI interrupt, thereby increasing performance of the virtual machine and the system.

It should be understood that, during processing of an interrupt, in a scenario in which VM-Exits are caused by multiple accesses of another type of interrupt to the virtual register of the APIC, a manner similar to this embodiment of the present invention may also be used to optimize the performance.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), a random access memory (RAM), or the like.

The disclosed are merely exemplary embodiments of the present invention, but are not intended to limit the scope of the present invention. Any equivalent variation figured out according to the claims shall fall within the protection scope of the present invention.

What is claimed is:

1. A method for implementing an inter-virtual processor interrupt, the method comprising:
   when a source virtual processor needs to trigger an interrupt to one or more target virtual processors,
   writing register data in a single write operation into a virtual register of a virtual advanced programmable interrupt controller (vAPIC) of the source virtual processor, wherein the virtual register comprises first reserved bits, a second reserved bit, and a plurality of fields including a destination mode field, the register data comprising:
   information about the one or more target virtual processors written into the first reserved bits,
   indication data written into at least the destination mode field of the plurality of fields used to indicate that the source virtual processor triggers the interrupt to the one or more target virtual processors wherein when the destination mode field of the indication data is 1, it indicates that the information about the one more target virtual processors identifies a plurality of target virtual processors, and when the destination mode data bit is 0, it indicates that the information about the one or more target virtual processors identifies a single target virtual processor,
   optimization data written into the second reserved bit of the virtual register of the vAPIC of the source virtual processor, so that when the optimization data written into the second reserved bit is 1, the optimization data instructs a virtual machine monitor to obtain the information about the one or more target virtual processors and the indication data from the virtual register by means of parsing, and
   the virtual machine monitor obtaining the information about the single target virtual processor or the plurality of target virtual processors contained in the information about the one or more target virtual processors and the indication data from the virtual register by means of parsing when the optimization data is 1, and injecting an inter-virtual processor interrupt corresponding to the interrupt, into the one or more target virtual processors according to the information about the one or more target virtual processors and the indication data.

2. The method according to claim 1, wherein:
   the virtual register is a high-order register or a low-order register of a virtual interrupt command register (vICR).

3. The method according to claim 1, wherein the plurality of fields includes a vector field, a delivery mode field, the destination mode field, a level field, a trigger mode field, and a destination shorthand field of the virtual register.

4. A computing node, comprising:
   a hardware layer, a virtual machine monitor that runs at the hardware layer, and at least two virtual machines that run on the virtual machine monitor, wherein the at least two virtual machines comprise a first virtual machine and a second virtual machine, the first virtual machine comprises a first virtual processor, the first virtual processor comprises a first virtual advanced programmable interrupt controller (vAPIC), and the first vAPIC comprises a first virtual register; and the second virtual machine comprises a second virtual processor;
   the first virtual processor is configured to: when the first virtual processor needs to trigger an interrupt to at least the second virtual processor, write register data in a single write operation into the first virtual register of the first vAPIC, wherein the first virtual register comprises first reserved bits, a second reserved bit, and a plurality of fields including a destination mode field, the register data comprising:
   information about the second virtual processor written into the first reserved bits,
   indication data written into at least the destination mode field of the plurality of fields used to indicate that the first virtual processor triggers the interrupt to at least the second virtual processor into the first virtual register, wherein when the destination mode field of the indication data is 1, it indicates that the information about the second virtual processor identifies a plurality of target virtual processors, and when the destination mode data bit is 0, it indicates that the information about the one or more target virtual processors identifies a single target virtual processor, and
   optimization data written into the second reserved bit of the first virtual register of the vAPIC of the first virtual processor; and
   the virtual machine monitor is configured to:
   when the optimization data written into the second reserved bit is 1, obtain the information about the second virtual processor and the indication data from the first virtual register by means of parsing, and inject an inter-virtual processor interrupt corresponding to the interrupt into the second virtual processor according to the information about the second virtual processor and the indication data,
   wherein the register data further comprises optimization data that is written to a reserved bit of the first virtual register, and the optimization data is used to instruct the virtual machine monitor to obtain the information about the second virtual processor and the indication data from the virtual register by means of parsing.

5. The computing node according to claim 4, wherein:
the first virtual register is a high-order register or a low-order register of a virtual interrupt command register (vICR).

6. The computing node according to claim 5, wherein the register data is written to the low-order register or the high-order register.

7. The computing node according to claim 4, wherein the plurality of fields includes a vector field, a delivery mode field, the destination mode field, a level field, a trigger mode field, and a destination shorthand field of the first virtual register.

8. A computer system, comprising:
at least one computing node, wherein the computing node comprises:
a hardware layer, a virtual machine monitor that runs at the hardware layer, and at least two virtual machines that run on the virtual machine monitor, wherein the at least two virtual machines comprise a first virtual machine and a second virtual machine, the first virtual machine comprises a first virtual processor, the first virtual processor comprises a first virtual advanced programmable interrupt controller (vAPIC), and the first vAPIC comprises a first virtual register; and the second virtual machine comprises a second virtual processor;
the first virtual processor is configured to: when the first virtual processor needs to trigger an interrupt to at least the second virtual processor, write register data in a single write operation into the first virtual register of the first vAPIC, wherein the first virtual register comprises first reserved bits, a second reserved bit, and a plurality of fields including a destination mode field, the register data comprising:
information about the second virtual processor written into the first reserved bits,
indication data written into at least the destination mode field of the plurality of fields used to indicate that the first virtual processor triggers the interrupt to at least the second virtual processor into the first virtual register, wherein when the destination mode field of the indication data is 1, it indicates that the information about the second virtual processor identifies a plurality of target virtual processors, and when the destination mode data bit is 0, it indicates that the information about the one or more target virtual processors identifies a single target virtual processor, and
optimization data that is written to the second reserved bit of the first virtual register of the vAPIC of the first virtual processor, and the optimization data so that when the optimization data written into the second reserved bit is 1, the optimization data instructs the virtual machine monitor to obtain the information about the second virtual processor by means of parsing; and
the virtual machine monitor is configured to obtain the information about the second virtual processor and the indication data from the first virtual register by means of parsing when the optimization data is 1, and inject an inter-virtual processor interrupt corresponding to the interrupt, into the second virtual processor according to the information about the second virtual processor and the indication data, wherein the inter-virtual processor interrupt comprises an interrupt between the first virtual processor and the second virtual processor.

9. The computer system according to claim 8, wherein:
the first virtual register is a high-order register or a low-order register of a virtual interrupt command register (vICR).

10. The computer system according to claim 9, wherein:
the first virtual processor is configured to write the register data into the low-order register or the high-order register.

11. The computer system according to claim 8, wherein the plurality of fields includes a vector field, a delivery mode field, the destination mode field, a level field, a trigger mode field, and a destination shorthand field of the first virtual register.

* * * * *